United States Patent [19]

Kronenberg

[11] Patent Number: 4,859,853

[45] Date of Patent: Aug. 22, 1989

[54] SOLID STATE GAMMA RAY DOSIMETER WHICH MEASURES RADIATION IN TERMS OF ABSORPTION IN A MATERIAL DIFFERENT FROM THE DETECTOR MATERIAL

[75] Inventor: Stanley Kronenberg, Skillman, N.J.

[73] Assignee: The United States of America as represented by the Secretary of the Army, Washington, D.C.

[21] Appl. No.: 152,128

[22] Filed: Feb. 4, 1988

[51] Int. Cl.$^4$ ............................ G01T 1/02; G01T 1/24
[52] U.S. Cl. ................................................. 250/370.07
[58] Field of Search ...................... 250/370.07, 370.14, 250/370.13, 370.01

[56] References Cited

U.S. PATENT DOCUMENTS

| | | | |
|---|---|---|---|
| 3,928,766 | 12/1975 | Clausen et al. | 250/273 |
| 3,959,653 | 5/1976 | Lee et al. | 250/374 |
| 4,039,808 | 8/1977 | Tanaka et al. | 250/370.01 |
| 4,408,164 | 10/1983 | East et al. | 328/117 |
| 4,415,237 | 11/1983 | Fox | 250/370 |
| 4,460,830 | 7/1984 | Allemand et al. | 250/370.07 |

OTHER PUBLICATIONS

Meyer et al., "The CdTe Sub-Miniature Semi-Conductor Detector: A Versatile Instrument for Detection of Gamma Radiation", International Journal of Applied Radiation and Isotopes, 26(11), 11-75, pp. 697-702.

Primary Examiner—Carolyn E. Fields
Attorney, Agent, or Firm—Michael J. Zelenka; James J. Drew

[57] ABSTRACT

A solid state gamma ray dosimeter which measures radiation in terms of absorption in a material different from the detector material. A solid state detector, an amplifier, an analog-to-digital interface and a microprocessor are combined in circuit to correct for differences between absorption of radiation in detector material and absorption in other materials, especially tissue. A suitable cladding may surround the detector. A method of generating dose translation data for calibrating the microprocessor is also disclosed. The solid state detector is attached to a multichannel analyzer circuit and subject to known doses of various monochromatic gamma rays. Output pulses from the detector are amplified and introduced into the multichannel analyzer. The spectrum produced is used to determine an average channel number (or pulse height) for a given dose of monochromatic radiation. The given dose is in units specific to material different from the detector material. The partial dose represented by a single detector pulse at that energy is computed. Partial doses for other energies are likewise computed. Dose translation data associates a partial dose with a given detector pulse height. Dose translation data is set in the microprocessor of the dosimeter. Such dose translation data can be used to calculate total dose and dose rate in units peculiar to material other than detector material.

3 Claims, 4 Drawing Sheets

SOLID STATE GAMMA RAY DOSIMETER WHICH MEASURES RADIATION IN TERMS OF ABSORPTION IN A MATERIAL DIFFERENT FROM THE DETECTOR MATERIAL

The invention described herein may be manufactured, used, and licensed by or for the Government of the United States for governmental purposes without the payment to me of any royalties thereon.

FIELD OF THE INVENTION

The present invention relates generally to gamma ray detectors, and more particularly to small solid state (crystal) gamma ray dosimeters which directly register dose and dose rate associated with absorption of gamma rays in materials different from the detector material.

BACKGROUND OF THE INVENTION

The typical small solid state gamma ray detector is a device which employs a single crystal of a material, such as cadmium telluride or silicon, to detect the presence of gamma rays.

For the applications contemplated for these small solid state gamma ray detectors, such as a pocket dosimeter for use on the nuclear battlefield, it is desirable to read dose or dose rate in units that correspond to the biological effect of the radiation, that is, in rads (tissue). One rad (tissue) is the radiation dose equal to an energy absorption of 100 ergs per gram of tissue. Similarly, one rad (detector material) is the radiation dose equal to an energy absorption of 100 ergs per gram of detector material. Another unit, the roentgen (R), is defined as the amount of radiation that produces one esu of charge in one cc of dry air at standard temperature and pressure. It can be expressed as that amount of radiation which produces $2.58 \times 10^{-4}$ coulombs of charge per kilogram of air. Since the fraction of the total energy that goes to producing free charge is constant, one roentgen (1 R) of radiation corresponds to 0.869 rads (air).

When gamma rays are absorbed by matter, the gamma ray energy is typically transferred to electrons which, in turn, transfer the energy to the rest of the mass, producing ionization, bond dissolution and eventual heating of the medium. In the case of a solid state semiconductor detector, the electron energy creates electron hole pairs in the semiconductor material which can carry signal current. Since the amount of charge produced is directly proportional to the energy deposited by the energetic electrons, the output of the ideal detector will be directly proportional to the energy deposited per unit mass of detector material. This output is, of course, measured in rads (detector material) rather than in rads (tissue).

To date, no pulse counting solid state detector has been developed which has the same density and atomic numbers as tissue. The one class of tissue equivalent solid state detectors that has been successful is the recently developed radiochromic dosimeters which have a very good match to tissue in terms of their atomic number, and thus give a response directly proportional to rads (tissue). One such device is disclosed in U.S. Pat. No. 4,489,240, issued to Kronenberg, et al. on Dec. 18, 1984. The response of these devices is, however, proportional to the integrated dose and, as such, their ability to act as dose rate meters is limited by their dynamic range and the maximum total dose before replacement of the sensitive element is required.

Another conceivable development is the use of industrial diamonds as very low atomic number semiconductor detectors, but the size, electronic properties and cost of this material makes this seem a farfetched approach. There have also recently been many developments exploring the semiconducting properties of polyacetylenes and other related organic polymers, but to date none of these has achieved the high resistivities needed for the direct detection of ionizing radiation.

Thus for any known semiconductor with sufficiently good electronic transport properties to act as a pulse counting radiation detector, there is a significant deviation in atomic numbers from those of tissue, and thus a correction must be made to convert the detector signal into rads (tissue). In particular, for a silicon detector of the type tentatively chosen for the pocket dosimeter, at least three effects must be taken into account. The first is that the energy dependence of the gamma ray absorption for silicon is quite different from that of tissue, since the higher atomic number of silicon significantly enhances the fraction of low energy gamma rays which will be absorbed.

The second factor is that the electrons which receive the energy from the gamma rays can travel much further in tissue than in silicon. This will change the depth dependence of the energy response of the silicon with respect to tissue.

A third factor which must be considered arises from the fact that the detector will have a finite, and usually small, size. This means that some gamma ray energy absorbed by material external to the detector will result in electrons entering the detector and producing signal. Similarly, some gamma ray energy absorbed in the detector will produce electrons which will leave the detector and therefore not produce the expected detector signal.

For a different detector material, such as cadmium telluride, these same factors acquire a different emphasis. Because of its higher atomic number, CdTe has a much more exaggerated response at low energies, and thus presents a more difficult case for dose compensaton. Since CdTe detectors are typically much thicker slab type devices than silicon diodes, the effects of electrons leaving the sensitive volume set in only at much higher energies, and could probably be neglected. The main advantage of CdTe in this context is its much greater sensitivity, which would allow measurement of dose rates down to background levels in reasonable time periods.

Thus in order for a detector to read directly in rads (detector material), it should be surrounded on all sides by a layer of the same material as the detector itself. Ideally the dimensions of the whole assembly should be much less than the range of the gamma rays, and the surrounding layer should be thicker than the range of the electrons emitted upon gamma ray absorption. The first condition assures that the dosimeter will respond to the full ambient flux, while the second guarantees that all the energy deposition mechanisms originate within the same type of material. In one embodiment of the present invention this requirement for cladding the detector with detector material can be relaxed. All that is necessary is that the cladding material be the same on all sides of the detector.

One great obstacle in making a small, tissue equivalent, solid state detector is in determining the relationship between the actual detector signal and the desired signal in terms of rads (tissue).

Note first that it is better to integrate the total charge signal produced by each of the detector pulses rather than simply to count the number of detector pulses. This is because it is the sum of the energy deposited by the gamma rays which is important rather than the number of rays which are absorbed. Integrating the charge converts the detector output to a signal proportional to rads (detector material).

If we examine the flux of incident gamma rays needed to produce an exposure rate of 1 R/hr, as a function of energy, we would see that the number of rays which produce this exposure decreases almost linearly with energy, in the energy range from 100 keV to 1 MeV. This indicates that the energy deposited in tissue by the gamma ray stream increases linearly with the incident energy. Thus, if it were possible to construct a tissue equivalent, solid state detector, an integration of the charge produced per unit time could produce an output directly proportional to rads (tissue).

The detector tentatively selected for the pocket dosimeter is made from silicon and it will therefore be necessary to modify its signal by various means to take into account the fact that both its density and average atomic number (Z) are significantly higher than those of tissue. Traditional approaches to tailoring the energy response of gamma ray detection instruments have relied on the use of absorbing foils which are used to attenuate the lower energy radiation and thus to reduce the over-response of the detector in this range. These approaches have always met with significant difficulties because available shielding materials cannot be combined to produce to sufficient accuracy the necessary conversion factor, especially when considering different angles of penetration. The other disadvantage of this approach is that the presence of any such shielding inevitably reduces the overall sensitivity. It is for these reasons that I chose not to shield the detector, but rather to use a microprocessor to compensate the response based on the information that is already available in a high resolution solid state detector.

However, it is important to first show that it is possible, at least in principle, to achieve a flat energy response from a non tissue equivalent detector. The argument is clearly stated: the pulse height spectrum produced by an ideal, non tissue equivalent, calibrated, solid state detector provides exact information on the magnitude of the gamma ray flux at each energy. This information is sufficient to calculate the exact dose in rads (tissue).

It can be shown that, for most cases of importance in solid state detectors, there is sufficient dose information available from the pulse height spectrum of a non ideal, non tissue equivalent, calibrated, solid state detector to yield the tissue dose. That is, even if the response of the detector is not flat, but is in fact quite nonlinear, dose and dose rates in terms of tissue dose can be accurately determined. This nonlinearity arises principally because of the difference in the energy dependent gamma ray stopping power of the detector compared to tissue.

In order to develop a device to compensate for the differences in response for the silicon and the tissue, we consider in detail the relationship between the output of the detector and series of incident monoenergetic gamma rays. This output can be displayed as a pulse height spectrum and clearly demonstrates that the detector response to an individual high energy photon is a probability distribution rather than a single value pulse height. Thus for a single event, it is not possible to learn much about the incident gamma ray energy, but by using a statistical approach for a collection of gamma rays, the dose information can be extracted.

While it is possible to analyze the raw output of a detector to obtain information on the incident gamma ray spectrum, and thus, on the dose and dose rate in rads (tissue), it is impossible at present to do an exact analysis with equipment which can be accommodated within the size, weight, and power constraints presented by the tactical nuclear battlefield.

In particular, while the detector electronics may be miniaturized, the detector itself must be large in physical dimensions and total mass in order to totally absorb the expected gamma radiation and yield an accurate picture of the incident photon spectrum.

A practical device must be smaller than this, and since it is small, it cannot absorb all the incident radiation and fully sample the gamma ray flux.

Those concerned with the development of small solid-state gamma ray dosimeters have long recognized the need to address these and other related problems and to develop such a detector which directly measures radiation absorption in terms of the effect on human tissue. The present invention meets this need.

SUMMARY OF THE INVENTION

It is an object of the invention to provide a small solid state gamma ray dosimeter which measures incident gamma radiation in terms of absorption in a material different from the detector material.

It is a further object of the invention to provide a small solid state gamma ray dosimeter which measures incident gamma radiation in terms of absorption in tissue.

It is yet another object of the invention to provide a technique for calibrating a small solid state gamma ray dosimeter to correct for effects specific to the detector material and thereby produce dose and dose rates specific to materials different from the detector material, for example, human tissue.

The present invention is a small solid state gamma ray dosimeter which measures dose and dose rate in units related to absorption of gamma radiation in materials other than the material from which the solid state detector was made. In particular, the detector can measure dose and dose rate in units of rads (tissue). This done by connecting, in sequence, a solid state semiconductor detector, an amplifier, an analog-to-digital interface, and a microprocessor. When properly reverse biased, this detector yields a current pulse when gamma radiation is absorbed. This current pulse generated in the detector is amplified, then converted to a digital signal. This digital signal, which represents the amount of charge liberated in the crystal counter as a result of incident radiation, is associated with dose translation data stored in the microprocessor to produce dose measurements, such as dose and dose rate, in terms of rads (tissue) or rads (tissue) per hour. The dose data is generated by analyzing the response of the solid state detector to known doses, in rads (tissue), of monochromatic radiation of various energies.

By using different dose translation data, the present invention may yield dose measurements in terms of the effect which incident radiation would have on other materials.

BRIEF DESCRIPTION OF THE DRAWING

These and other objects and advantages of the invention will become apparent from the following detailed description when taken in conjunction with the accompanying drawing, in which.

DETAILED DESCRIPTION

Figure 1:
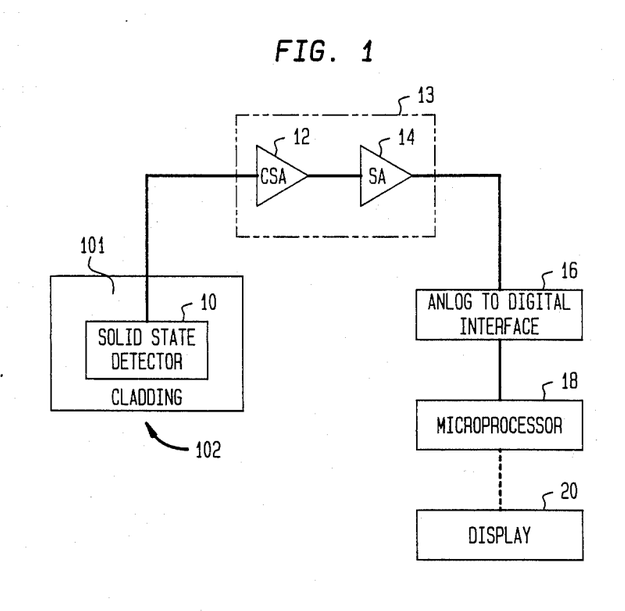
FIG. 1 is a block diagram of a solid state gamma ray dosimeter which embodies the subject invention.

Referring to the drawing wherein like reference numerals refer to like components throughout, attention is first directed to FIG. 1. In this figure, a series of electronic components is arranged to constitute a gamma ray dosimeter. The circuit manipulates a current pulse generated by a reverse biased solid state detector 10 when a gamma ray is absorbed. The resulting current pulse is handled, in turn, by a charge sensitive amplifier 12, a shaping amplifier 14, an analog-to-digital interface 16, a microprocessor 18, and a display 20.

The detector 10 may be made of silicon or cadmium telluride, or other suitable material, which is fabricated as a PIN diode. One example is the Hamamatsu #1723-06 or its equivalent. This diode is reverse biased to establish an electric field in the crystal and no resulting current flow. When an incident gamma ray produces an energetic electron within the crystal material, perhaps through Compton scattering, this electron produces charge pairs, electrons and holes, as it travels through the depleted layer of the crystal. The imposed electric field sweeps the charge pairs from the depleted layer and presents a current surge to the external circuit.

The charge sensitive amplifier 12 amplifies the current surge and produces a pulse whose magnitude or height is proportional to the amount of charge collected in the crystal. This charge sensitive amplifier 12 should have the following properties: It should have a good high frequency response to the sharply peaked pulses expected from the detector 10 when the energetic electrons liberate energy in the depleted layer; it should have a high input impedance and a very linear response to the pulses; and, it should act as a power amplifier to the next stage.

The shaping amplifier 14 takes the amplified current pulse and alters the form of the pulse to make it more acceptable to the analog-to-digital interface 16. The shaping amplifier 14 is of common design, using, for instance, Texas Instruments TI TL064 operational amplifiers. This shaping amplifier 14 should nave the following properties: it should be highly linear in its response, and it should somewhat stretch the pulse provided by the charge sensitive amplifier 12 to create a better input to the analog-to-digital interface 16. The properties and circuit design of these amplifiers 12 and 14 are well-known to those in the art. It is possible to combine both the charge sensitive amplifier 12 and the shaping amplifier 14 into a single stage amplifier 13.

The analog-to-digital interface 16 changes analog information, such as pulse height, received from the shaping amplifier 14, into digital information in a form which can be used directly by the microprocessor 18. This analog-to-digital interface 16 could be the National ADC0820 chip, or some similar device, chosen to be compatible with the microprocessor 18. There are a large number of devices available to serve as the microprocessor 18, such as the commercially available 16 bit Intel 80286, or the 32 bit Intel 80386 or Motorola 68020. The function of the microprocessor 18 in carrying out the principles of the present invention will be dealt with in detail below. Again, it is possible to combine both the analog-to-digital interface 16 and the microprocessor 18 into a single electronic component which could accept an analog signal and produce a digital (or even analog) output.

The display 20 discloses the contents of the microprocessor 18. It could be an integral part of the device, or it could be remote from the other dosimeter elements. In some applications, the dosimeter will only be read remotely, or in such a way as to prevent the user from knowing the dose received. There are a very large number of suitable displays, employing LEDs, LCDs, analog meters, paper tape, or other materials which can be matched to the microprocessor 18.

Figure 2:
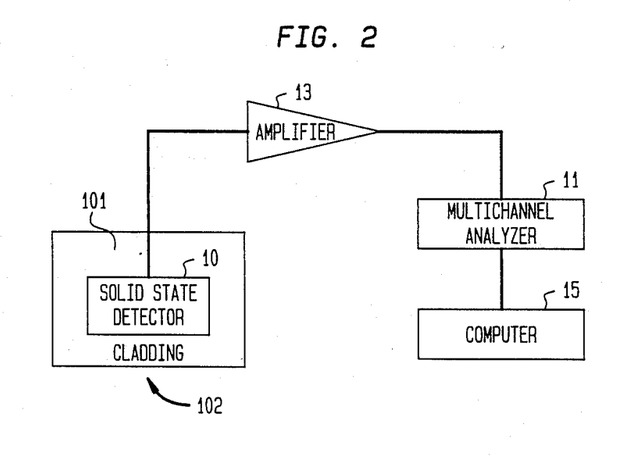
FIG. 2 is a block diagram of a solid state gamma ray dosimeter employing a multi-channel analyzer; and, FIGS. 3 through 7 are graphs which are useful in the explanation of the invention.

FIG. 2 illustrates a common well-known detector circuit used to measure gamma radiation in which a reverse-biased solid state detector 10 feeds a pulse input into an amplifier 13 which then supplies an appropriate signal to a multi-channel analyzer 11. The bias voltage could be supplied by a bias power supply such as a battery. The amplifier 13 could be a Canberra 808 preamplifier combined with a linear spectroscopy amplifier, such as the ORTEC 801. The multi-channel analyzer 11 could be the Canberra Series 20 coupled with any compatible computer 15 capable of analyzing the data produced. This circuit is used to calibrate the dosimeter of FIG. 1 by accumulating the dose translation data to be stored in the microprocessor 18.

The following discussion deals with dose measurements in units of rads (tissue), although the technique may be suitably modified for units of rads (other material).

Figure 3:
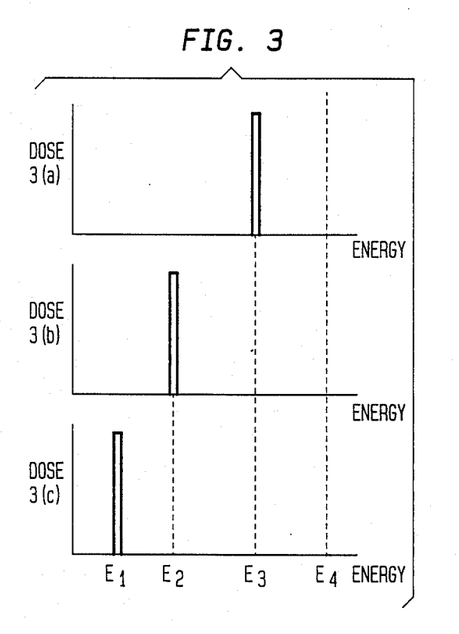

Consider the graphs of FIG. 3. Graph 3(a) suggests a monochromatic (monoenergetic) gamma ray beam of energy E3 delivered to the solid state detector 10 until a given number of rads (tissue) has been absorbed by the detector 10. This could be done in the following way: A monoenergetic x-ray source shines on the detector 10 at a specified intensity and for a specified period of time until a dose of one rad (tissue) has been delivered to the detector 10. The required intensity and exposure time for that particular monoenergetic beam is determined from previous experiments. Likewise, graph 3(b) shows a monochromatic beam of energy E2, and graph 3(c) a monochromatic beam of energy E1. E4 represents the maximum energy available for the procedure. The dose absorbed by the solid state detector 10 in units of rads (tissue) is the same in each graph 3(a), 3(b), and 3(c), namely, one rad (tissue).

Figure 4:
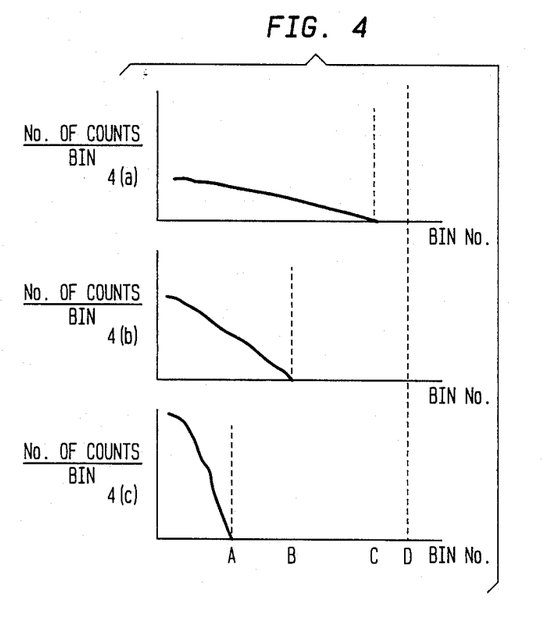

Graph 4(a) illustrates a typical display from the multi-channel analyzer 11 of FIG. 2 which is receiving the appropriately amplified pulses from the solid state detector 10 exposed to the monochromatic gamma ray beam of energy E3 illustrated in graph 3(a). The function of the multi-channel analyzer 11 is to assign input pulses to various channels or bins according to the magnitude of the input pulse, and to record the number of such pulses stored in each such bin. The horizontal axis of graph 4(a) is divided into numbered channels or bins and scaled in proportion to the height of the pulses received at the input. The vertical axis of graph 4(a) is calibrated to indicate the number of pulses accumulated in each bin. The area under such a curve is the total number of counts accumulated in all bins. Graphs 4(b) and 4(c) are similar to graph 4(a), except that they represent a typical response of the multi-channel analyzer 11 to monochromatic beams of energy E2 and E1, respectively. Note that the highest numbered occupied bin is marked in each of graphs 4(a), 4(b), and 4(c). This bin number is scaled to correspond to the energy of the monochromatic gamma ray beam in each case, that is, bin number A corresponds to energy E1, bin number B corresponds to energy E2, and so forth.

Solid state detectors are generally more sensitive to lower energy gamma rays than they are to higher energy gamma rays. This means that many more pulses are recorded for the low energy gamma rays even when the spectrum of incident gamma ray energy is flat. Since the radiation dose received is proportional to the energy of each gamma absorbed in the depleted layer multiplied by the number of gammas absorbed at that energy, the solid state detector incorrectly emphasizes the low energy radiation received when the detector is used to measure the dose delivered to tissue.

In order to have the dosimeter circuit illustrated in FIG. 1 yield dose measurements in units of rads (tissue), the relationship between pulses produced in a solid state detector and the absorption of gamma radiation in tissue has to be determined. once this is done for a particular type of crystal detector, in a specific geometry, with a specific cladding, the calibration results are the same for all such detectors. In other words, the following calibration procedure has to be done only once to determine the contents of the microprocessor 18 for all such solid state detectors.

Returning now to FIG. 2, the solid state detector 10, which is to be used to calibrate the family of like detectors, is connected to an amplifier 13 and the appropriate reverse bias voltage (not shown) is applied.

The solid state detector 10 is exposed to monochromatic gamma rays until a predetermined amount of radiation, measured in rads (tissue), is absorbed, as illustrated by graph 3(a). Incident gamma rays generate pulses as described above and the resulting pulses from the solid state detector 10 are amplified then fed into a multi-channel analyzer 11, or similar device, which will assign the pulses to numbered bins according to the magnitude of the pulse. Each bin, then, represents a uniform slice of the energy spectrum. The number of pulses or counts accumulated in each bin over some period of time is recorded. The resulting graph of (number of counts per bin) versus (bin number) is displayed on the multi-channel analyzer 11 in the form of a graph similar to graph 4(a) of FIG. 4. This graph is analyzed to determine an average bin number for that dose of monoenergetic gamma rays. This average bin number is computed as a weighted average in this manner:

Average bin number = $(1/N) \times$

[(number of counts in bin 1) $\times$ (1) +

(number of counts in bin 2) $\times$ (2) + ... +

(number of counts in bin $N$) $\times$ ($N$)]

where N is the total number of counts.

Figure 5:
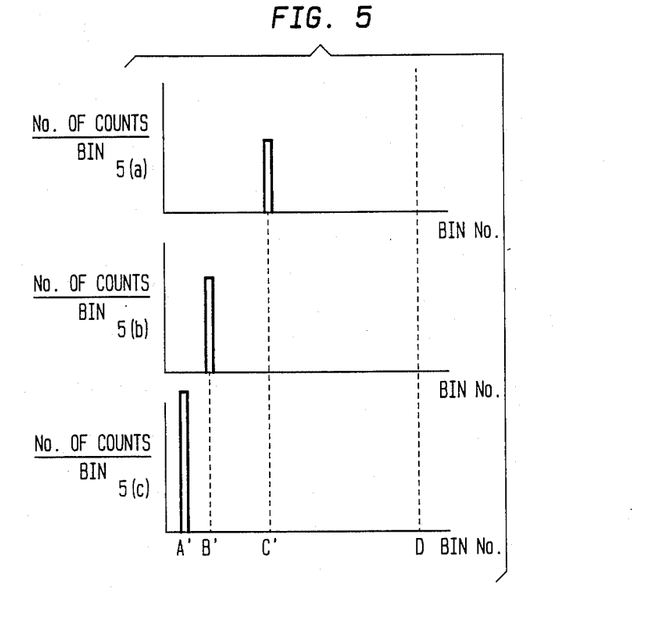
Figure 6:
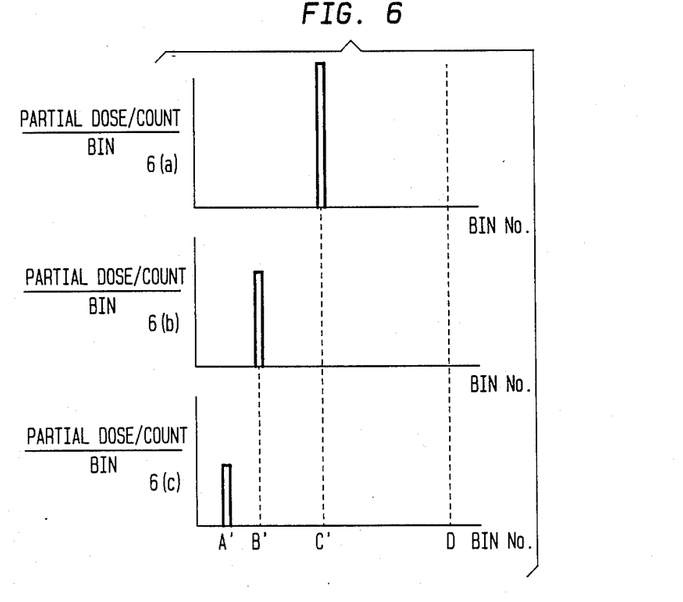

The graphs of FIGS. 5 and 6 continue the example begun in FIGS. 3 and 4. Graph 5(a) shows all of the counts accumulated in graph 4(a) as if they all occurred in the average bin, using Equation 1 to calculate the average bin number C'. Each such count is then assigned a partial dose such that, if all these partial doses are added together, the total dose accumulated under the conditions described above for graphs 3(a) and 4(a), would be obtained. In brief, if graph 4(a) shows a total of N counts accumulated over all the bins, all N counts would be assigned to the average bin C' in graph 5(a). Each such count would then be assigned a partial dose of 1/N of the dose delivered to the solid state detector 10 under the conditions described above for graphs 3(a) and 4(a). Graph 6(a) shows the partial dose associated with each count assigned to the average bin number C'.

The process explained above is now repeated with identical doses of radiation but with monochromatic gamma rays of different energies. That is, in each repetition, the solid state detector 10 of FIG. 2 will be exposed to the same calibrated x-ray source set to a different energy, with a corresponding intensity and exposure time to produce a dose of one rad (tissue). FIGS. 3(b) and 3(c) illustrate exposure of the detector 10 to gamma rays of energy E2 and E1, respectively. FIGS. 4(b) and 4(c) show the corresponding response displayed by the multi-channel analyzer 11 to these exposures. Graph 5(b) shows all the counts accumulated in the average bin B' after application of Equation 1 to the data of FIG. 4(b), and FIG. 5(c) shows similar information for the data of FIG. 4(c), where the average bin number was computed to be A'. The area under each curve of FIG. 4 is the height of each corresponding bar in FIG. 5. Graphs 6(b) and 6(c) show the partial dose represented by one pulse accumulated in bin number B' and A', respectively.

This sequence of experiments will ultimately yield a set of paired numbers: partial dose in rads (tissue) represented by one count identified with an average bin number, and average bin number. If this set is plotted as in FIG. 7, for each bin number there will be a corresponding partial dose in rads (tissue) per count.

Figure 7:
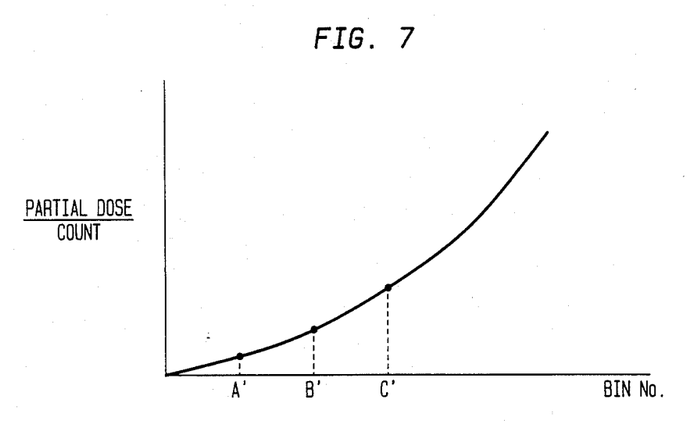

This set of paired numbers is stored in a microprocessor 18 which can now associate an inputted bin number with a corresponding partial dose in rads (tissue) per count. The only requirement for this technique to work is for the partial dose in rads (tissue) represented by one count identified with an average bin number to be a monotonically increasing (or decreasing) function of the bin number. This can be accomplished by suitable choice of detector cladding and geometry. This latter point is not trivial and, since it contributes to the accuracy of the present invention, it will be explained in more detail.

Two factors concerned with differences between gamma absorption by tissue and that by detector material presented problems which are solved in one embodiment of the present invention. The first of these is the problem caused by the finite dimensions of the crystal itself. Some gamma rays produce energetic electrons outside the detector which enter the detector and produce charge pairs in the depleted layer. This misrepresents the actual dose which tissue would have received from those gamma rays. The second factor involves the fact that not all of the charge pairs produced in the crystal contribute to the current pulse. Only those pairs generated in the depleted layer are swept out by the bias voltage, while the other charge pairs are immobilized in the crystal structure.

In one embodiment of the present invention, the solid state detector 10 is surrounded by material identical to the crystal material, and of a thickness sufficient to establish electron equilibrium, thus creating a composite detector 102. This cladding should be thicker than the maximum range of the energetic electrons which result from gamma ray absorption. This insures that any betas created outside the detector will not reach the depleted layer, and any betas which create charge pairs in the depleted layer must have come from crystal material. Further, the dimension of the composite detector 102, crystal plus cladding, should be less than the range of the gamma rays to insure that the detector is responding to the entire gamma flux. Finally, by choosing dimensions and cladding within these criteria, the problem created by the failure of the energetic electrons to deposit all charge pairs within the depleted layer is eliminated.

After the above calibration procedure, which produced the curve illustrated in FIG. 7, the solid state detector 10 may be disconnected from the circuit of FIG. 2 and attached as shown in FIG. 1. Now, when a pulse is generated in the detector 10, it is amplified, shaped, and fed into the analog-to-digital interface 16 which assigns to that pulse a number proportional to the magnitude of the pulse.

This assigned number is fed into the microprocessor 18 which considers that number to be a bin number. The microprocessor 18 contains dose translation data which may include: the relationship expressed in FIG. 7 which associates the inputted bin number with a partial dose in rads (tissue); algorithms to accumulate successive partial doses to produce the total dose; and, algorithms to accumulate partial doses from time to time to produce the dose rate. Other algorithms may be stored to exploit the available data to produce other useful information on the gamma ray flux and its effects. While it is true that a single pulse generated by the crystal detector and assigned to a particular energy bin cannot be definitely associated with the absorption of a gamma ray of a particular incident energy, nor with a particular dose, it can be shown that this process will accurately predict the dose absorbed if the number of pulses are reasonably large, regardless of the spectrum of the incident gamma flux.

The contents of the microprocessor 18 may be read from a display 20. For example, the total dose received may be displayed, or, by measuring the incremental dose from time to time, the dose rate may be displayed. In some applications, it may be desirable to eliminate the display and to allow the microprocessor to be read remotely, or at a later time, or both.

There are at least two overall approaches to processing the pulses originating from the solid state detector in order to calculate the tissue equivalent dose rate. The first involves taking each individual pulse, multiplying it in real time by some correction factor which is dependent on the magnitude of the pulse and then adding this estimated dose contribution to the previously stored data. The second approach involves storing all of the unprocessed detector pulses including their amplitude information for a fixed period of time (e.g. one second) and to then analyzing the entire group of pulses as one batch.

This second approach, however, forces one to adopt an assumption of a static spectrum. Clearly if the spectrum remains constant during the integration time, then the collected data is representative of a particular irradiation. If, on the other hand, the energy spectrum is changing during the integration time, then the collected spectrum might well be misinterpreted and hence an incorrect compensation factor applied. This situation argues that a pulse by pulse approach is far preferable. Within the context of single pulse based compensation algorithms, one can separate out those designs based on analog electronics which would make use of nonlinear amplifiers, and digital systems which rely on quantifying the pulse height digitally and then apply a compensation factor before accumulation the total estimated dose in a digital counter. However, the digital processing of the signal appears preferable, being both practical and cost effective and providing more versatility and reliability than any conceivable analog approach.

One important aspect of this invention which bears repeating is it can be used to measure the dose in terms of any absorbing material. This feature would be particularly useful in measuring damage to solid state devices such as those used in microwave monolithic integrated circuits. For example, if a silicon detector is used, and dose in rads (GaAs) is desired, the detector may be calibrated by exposing it to known doses in rads (GaAs) instead of rads (tissue). The process detailed above is the same, but the microprocessor 18 is loaded with information relating bin number with a corresponding dose in rads (GaAs).

Obviously many modifications and variations of the present invention are possible in the light of the above teachings. It is therefore to be understood that, within the scope of the appended claims, the invention may be practiced otherwise than as specifically described.

What is claimed is:

1. A radiation dosimeter, comprising:
   A solid state detector which produces an output pulse when radiation is absorbed;
   an amplifier connected to said solid state detector which receives said output pulse and which produces an amplified pulse proportional to said output pulse;
   an analog-to-digital interface connected to said amplifier which receives said amplified pulse and which converts said amplified pulse into a corresponding digital output;
   a microprocessor connected to said analog-to-digital interface which receives said digital output and which associates said digital output with non-tissue dose translation data to produce a non-tissue dose measurement.

2. A radiation dosimeter, comprising:
   A solid state detector which produces an output pulse when radiation is absorbed;
   an amplifier connected to said solid state detector which receives said output pulse and which produces an amplified pulse proportional to said output pulse;
   an analog-to-digital interface connected to said amplifier which receives said amplified pulse and which converts said amplified pulse into a corresponding digital output; and
   a microprocessor connected to said analog-to-digital interface which receives said digital output and which associates said digital output with dose translation data to produce a dose measurement;
   wherein the solid state detector is substantially surrounded by a cladding material identical to the detector material;
   wherein the thickness of said cladding material is greater than the maximum range of energetic electrons emitted upon absorption of gamma rays which constitute the radiation to which the dosimeter is exposed; and wherein the dimensions of the solid state detector and said cladding material are less than the maximum range of the gamma rays which constitute the radiation to which the dosimeter is exposed.

3. The dosimeter as recited in claim 2 wherein the dose measurement is expressed in units of rads (tissue).

* * * * *